(12) United States Patent
Andre et al.

(10) Patent No.: US 12,054,114 B2
(45) Date of Patent: Aug. 6, 2024

(54) RETRACTABLE AERODYNAMIC UNDERBODY FLAP WITH FORCE ABSORPTION BY THE LOWER SUPPORT

(71) Applicant: Compagnie Plastic Omnium, Lyons (FR)

(72) Inventors: Gérald Andre, Saint Denis en Bugey (FR); Stéphane Ginja, Amberieu en Bugey (FR)

(73) Assignee: Compagnie Plastic Omnium, Lyons (FR)

( * ) Notice: Subject to any disclaimer, the term of this patent is extended or adjusted under 35 U.S.C. 154(b) by 682 days.

(21) Appl. No.: 16/614,266

(22) PCT Filed: May 14, 2018

(86) PCT No.: PCT/FR2018/051166
§ 371 (c)(1),
(2) Date: Mar. 25, 2022

(87) PCT Pub. No.: WO2018/211206
PCT Pub. Date: Nov. 22, 2018

(65) Prior Publication Data
US 2022/0234531 A1     Jul. 28, 2022

(30) Foreign Application Priority Data

May 16, 2017    (FR) ..................................... 1754313

(51) Int. Cl.
*B60R 19/48*     (2006.01)
*B60R 19/12*     (2006.01)
(Continued)

(52) U.S. Cl.
CPC .............. *B60R 19/48* (2013.01); *B60R 19/12* (2013.01); *B60R 21/34* (2013.01); *B62D 35/02* (2013.01);
(Continued)

(58) Field of Classification Search
None
See application file for complete search history.

(56) References Cited

U.S. PATENT DOCUMENTS 4,457,558 A  *  7/1984   Ishikawa .............. B60K 11/085
                                                    296/180.5
6,435,577 B1     8/2002   Renault
(Continued)

FOREIGN PATENT DOCUMENTS

DE     199 04 515 A1     8/2000
DE     101 37 175 A1     2/2003
(Continued)

*Primary Examiner* — Joseph D. Pape
(74) *Attorney, Agent, or Firm* — Dinsmore & Shohl LLP

(57) ABSTRACT

The motor vehicle comprising an aerodynamic underbody flap (1) rotating about a transverse axis (10) and a lower transverse structure (4) arranged at the rear of the lower part of a front bumper (6). The rear part of the lower transverse structure (4) comprises guide means (41, 42) which, in the event of a frontal impact, guide the backward movement of the lower transverse structure (4) such that the rear face of the lower transverse structure (4) comes into contact with the axis (10) of the aerodynamic underbody flap (1).

12 Claims, 2 Drawing Sheets

(51) Int. Cl.
  *B60R 21/34* (2011.01)
  *B62D 35/02* (2006.01)
  *B62D 37/02* (2006.01)

(52) U.S. Cl.
  CPC ........ *B62D 37/02* (2013.01); *B60R 2021/343* (2013.01)

(56) References Cited

U.S. PATENT DOCUMENTS

| | | |
|---|---|---|
| 8,702,152 B1 | 4/2014 | Platto et al. |
| 9,517,802 B1 | 12/2016 | Froling et al. |
| 2012/0019025 A1 | 1/2012 | Evans et al. |

FOREIGN PATENT DOCUMENTS

| | | | | |
|---|---|---|---|---|
| DE | 10 2009 034906 A1 | | 2/2011 | |
| EP | 1541452 A1 | * | 6/2005 | ........... B62D 35/005 |
| FR | 2 864 811 A1 | | 7/2005 | |
| FR | 2 927 303 A1 | | 8/2009 | |
| FR | 3043634 A1 | * | 5/2017 | ........... B62D 35/005 |
| JP | 2008137591 | | 6/2008 | |
| KR | 20160043545 | * | 4/2016 | |

\* cited by examiner

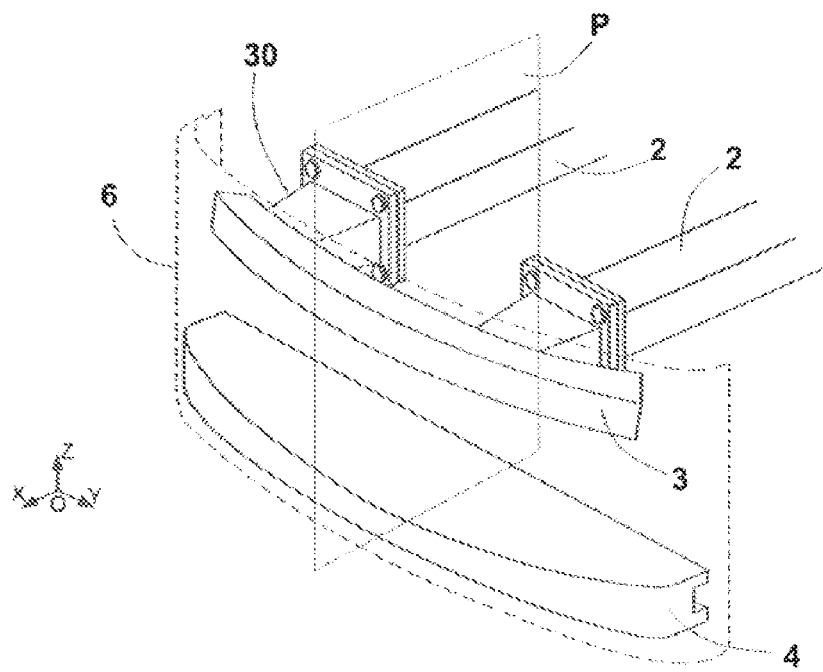
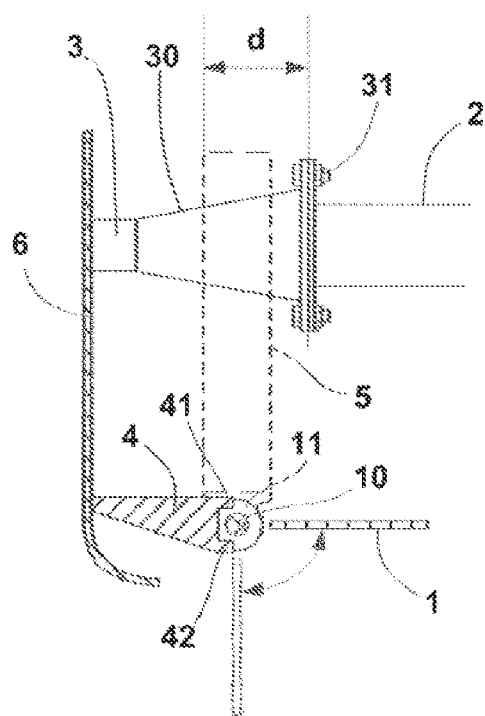
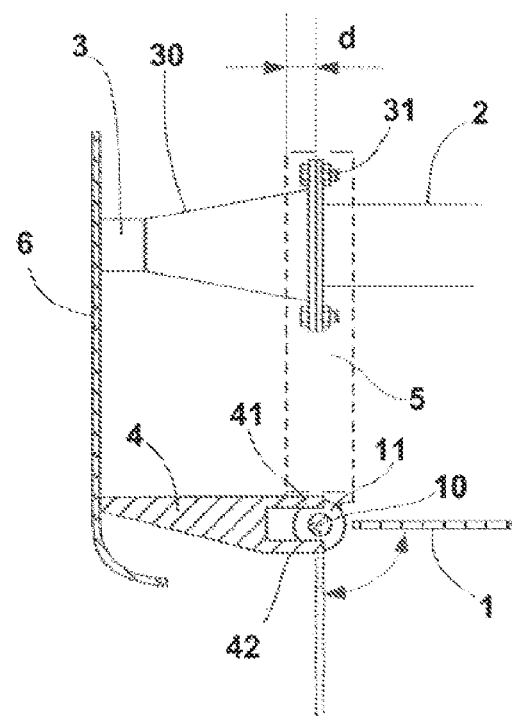
Fig 1
Fig 2
Fig 3

RETRACTABLE AERODYNAMIC UNDERBODY FLAP WITH FORCE ABSORPTION BY THE LOWER SUPPORT

The invention relates to the front part of motor vehicles, and more particularly the arrangement of the different elements present in that part, with the object of improving the resistance of the vehicle to frontal impact.

The design of the front part is subject to numerous tests and complex calculations making it possible to predetermine the state of the vehicle after an impact. If the impact is great, the controlled deformation of the front of the vehicle serves to preserve the life of the passengers onboard. However, below a certain threshold, if the impact is deemed not to affect the physical integrity of the vehicle's occupants, the designers then devise a way to absorb the energy by allowing the deformation of certain clearly identified elements so as, on the one hand, to reduce the consequences of an impact on a road user outside the vehicle such as a pedestrian, and, on the other, to minimize the cost of repairing the vehicle.

These protective elements may comprise a curved beam, fixed to the longitudinal side members of the vehicle by means of a crash box designed to absorb part of the energy of the impact by deforming and constituting the upper transverse structure. The front bumper is usually mounted so as to cover the upper transverse structure.

The technical elements located in the frontal area and constituting the technical front face are mounted on a frame which is itself usually fixed onto the side members or, preferably, if the occupation of the space in the engine compartment needs to be optimized, onto the front of the crash box or onto the rear face of the beam constituting the upper part. In the event of an impact, the deformation of the crash box enables the backward movement of the technical front face without damage.

A second curved transverse beam, constituting the lower transverse structure, is fixed onto the lower part of the bumper and thus reinforces the latter. This lower part, usually formed of a reinforced composite material or an injected thermoplastic material, is designed gradually to deform until reaching a certain threshold before the upper transverse structure and the crash box themselves begin to deform. Its function is therefore to be first to absorb impacts at low speeds of less than or equal to 15 km/h.

The function of the lower structure is also to absorb part of the energy on impact with a pedestrian's leg before the upper structure is in its turn stressed.

The lower transverse structure can also serve to block the passage of air towards the engine compartment.

Furthermore, in order to reduce the aerodynamic drag of modern vehicles, a movable aerodynamic underbody flap can be used, arranged at the front of the vehicle in order to reduce and direct the flow of air passing beneath the vehicle. This aerodynamic flap rotates about a transverse axis held by bearings connected to a fixed part of the vehicle such as, for example, the frame of the technical front face. The aerodynamic underbody flap is driven in rotation about its axis between an open position and a closed position by actuators of the electric type, for example.

The assembly formed by the aerodynamic underbody flap and its axis thus constitutes an element capable of playing a part in the vehicle's shock resistance.

The aim of the invention is to exploit the proximity between the lower transverse structure and the components forming the aerodynamic flap in order to optimize the performance of the vehicle in the event of a frontal impact.

The motor vehicle according to the invention thus comprises an aerodynamic underbody flap rotating about a transverse axis and a lower transverse structure arranged at the rear of the lower part of a front bumper.

This vehicle is characterized in that the rear part of the lower transverse structure comprises guide means which, in the event of a frontal impact, guide the backward movement of the lower transverse structure such that the rear face of the lower transverse structure comes into contact with the axis of the aerodynamic underbody flap.

In the event of a frontal impact at low speed, the deformation of the lower transverse structure towards the rear of the vehicle allows the rear part of the lower transverse structure to come into contact with the axis of the aerodynamic underbody structure. This has the effect of enabling the lower transverse structure to benefit from an increase in resistance linked to the combination of the structural resistance of the lower transverse structure and the resistance of the axis of the aerodynamic underbody flap. It will be observed here that, when the aerodynamic underbody flap is in the closed position and extends the axis in a plane parallel to the ground, which is the case when the vehicle travels at low speed, the inertia of the axis, and thus the resistance of the assembly, is increased by the wall constituted by the aerodynamic underbody flap itself.

The arrangement as described above allows the structural resistance of the lower transverse structure to be reduced in order to increase the progressivity of the deformation of said lower transverse structure at low energies. This arrangement thus makes it possible to reduce the physical injury caused to a pedestrian in the event of an impact at low speed. It also increases the contribution of the lower structure to the absorption of the energy of an impact involving the front face of the vehicle up its entire height.

The device according to the invention may also have in isolation, or in combination, the following characteristics:

The axis of rotation of the aerodynamic underbody flap is mounted on bearings fixed onto the lower part of a frame of a technical front face.

The frame of the technical front face is fixed onto the rear part of an upper transverse structure.

The upper transverse structure is fixed onto the front end of longitudinal side members by means of crash boxes.

The frame of the technical front face is arranged at a distance of more than 100 mm from the front end of said longitudinal side members.

The frame of the technical front face is fixed directly onto the longitudinal side members.

The guide means are formed by one or more upper clamps and by one or more lower clamps extending the lower structure respectively above and below the axis of the aerodynamic underbody flap.

The aerodynamic underbody flap has windows arranged near the axis to allow the passage of the lower clamps through the aerodynamic flap when said aerodynamic underbody structure is in the open position.

The lower clamps and the upper clamps are arranged transversely and alternately.

The lower clamps and the upper clamps extend around the rear part of the axis of the aerodynamic underbody flap.

The aerodynamic underbody flap is made using a thermoplastic material.

The axis of the aerodynamic underbody flap comprises an inserted reinforcement piece in the form of a rod made of metal or a composite material around which is molded the thermoplastic part forming the aerodynamic underbody flap.

A clearer understanding of the invention will emerge from the accompanying Figures, which are provided by way of example and are in no way limiting, wherein:

FIG. 1 is a schematic perspective representation of the front part of a vehicle.

FIG. 2 is a schematic cross-sectional view in a plane perpendicular to the transverse direction of the device covered by the present invention.

FIG. 3 is a schematic cross-sectional view in a plane perpendicular to the transverse direction of an alternative embodiment of the invention.

Figure 4:
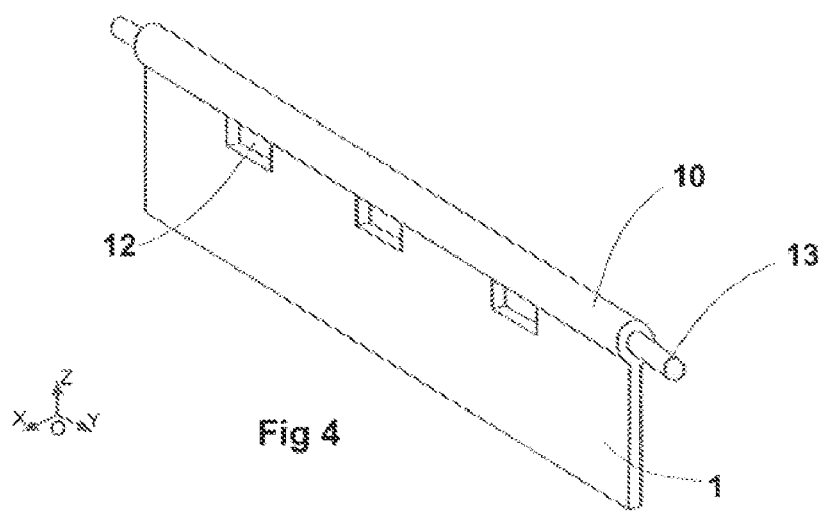
FIG. 4 is a schematic perspective view of the aerodynamic underbody structure.

In what follows, in the orthonormal coordinates OXYZ, direction OX, oriented in the forward direction of the vehicle, is called the longitudinal direction, direction OY, oriented in the transverse direction of the vehicle, is called the transverse direction, and direction OZ, oriented from bottom to top, is called the vertical direction.

FIG. 1 shows the main structural elements of the front part of a vehicle.

An upper curved transverse beam 3, commonly called the upper transverse structure, is mounted by means of two crash boxes 30 to the front end of two side members 2 oriented in the longitudinal direction of the vehicle.

The bumper 6, shown by a dotted line, is fixed to the front of the upper transverse structure 3.

The lower part of the bumper 6 conceals a transverse beam 4, commonly called the lower transverse structure. As previously mentioned, this lower transverse structure 4 serves to reinforce the lower part of the bumper 6 and to limit its deformation in the event of an impact at low speed.

FIG. 2 shows the case in which the vehicle comprises an aerodynamic underbody flap 1 rotating about a transverse axis 10 between a closed position and an open position (shown by dotted lines). The axis 10 of the aerodynamic underbody flap 1 is supported by bearings 11 mounted on the frame 5 (shown by dotted lines) of the technical front face, the elements of which, such as a condenser, guide means, a radiator or a horn, have not been shown in the interests of clarity.

The bearings 11 are usually arranged at the two lateral ends of the aerodynamic underbody flap 1. The aerodynamic underbody flap as well as the axis 10 are made, for example, of a thermoplastic material. In order to prevent the deformation of the flap 1 under the effects of dynamic forces, it may be necessary to reinforce the axis 10 with the aid of a transverse insert 13 in the form of a rod made of metal or a composite material around which is molded the thermoplastic part forming the flap itself.

The lower transverse structure 4 is fixed onto the lower part of the bumper 6. It will be observed here that the fixing elements of the lower transverse structure are independent of those of the fixing of axis 10, so that the lower transverse structure must travel a certain distance, in the order of several millimeters, before coming into contact with the axis 10 of the aerodynamic underbody flap 1. This arrangement avoids interfering with the rotational movement of the aerodynamic flap and provides the operators working on the assembly lines with easy access to the fixing elements.

The guide means are formed by upper 41 and lower 42 clamps projecting towards the rear of the lower transverse structure 4 and designed to surround the upper part and the lower part of the axis 10 of the aerodynamic underbody flap 1 so that in its backward movement, the rear part of the lower transverse structure 4 comes into contact with the front part of the axis 10.

FIG. 2 also shows the case in which the frame 5 of the technical front face is arranged at a distance d, in front of the side members 2.

This arrangement has the advantage of bringing the aerodynamic underbody flap 1 forwards closer to the bumper and the front of the vehicle, and of improving the aerodynamic efficiency of the vehicle. It also enables a shorter lower transverse structure that occupies less space to be fitted.

Ideally, this distance d is greater than about one hundred millimeters, measured between two vertical planes perpendicular to the OX axis and passing through the front end part of the technical front face and through the front end of the longitudinal side members 2 respectively.

The frame 5 of the technical front face can then be fixed onto the rear part of the upper ansverse structure 3 or onto the crash box 30, as desired.

In the event of a frontal impact that may cause the deformation of the box 30, the frame 5 of the technical front face also moves backwards thus preventing damage to the elements that it supports.

FIG. 3 illustrates the case, less favorable from an aerodynamic point of view, in which the frame 5 of the technical front face is fixed directly onto the front of the side members 2. The lower transverse structure must then be longer or, as illustrated, must have extended clamps and a greater backward travel in order to delay the deformation of the box 30.

FIG. 4 shows in greater detail the aerodynamic underbody flap 1, wherein the windows 12 are made in the part of the aerodynamic underbody flap located near the axis 10. These windows 12 serve to allow the passage of the lower clamps 42 when the aerodynamic underbody flap 1 rotates from the dosed position to the open position.

Figure 5:
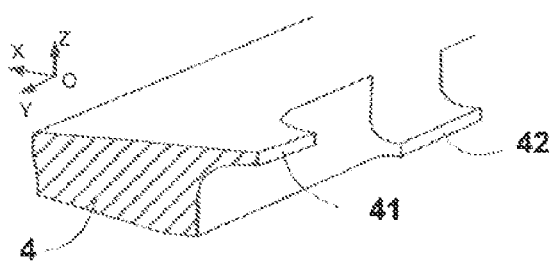
FIG. 5 is a schematic perspective view of a first embodiment of the guide means of the lower transverse structure.

FIG. 5 shows in greater detail the rear part of the lower transverse structure 4 on which the upper clamps 41 and the lower clamps 42 are installed. It will be observed that the upper and lower clamps are not placed opposite one another and are arranged transversely in alternating order.

In this first embodiment, the clamps 41 and 42 are designed to position themselves around only the front part of the axis 10. This first embodiment enables easier demolding of the lower transverse structure 4 when the latter is made of injected thermoplastic.

Figure 6:
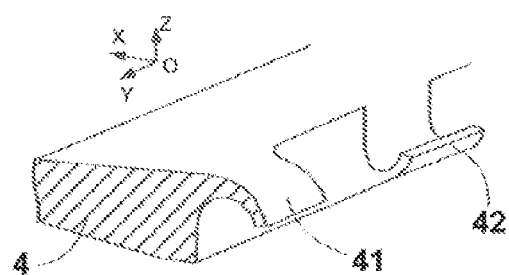
FIG. 6 is a schematic perspective view of a second embodiment of the guide means of the lower transverse structure.

In a second embodiment, shown in FIG. 6, the clamps 41 and 42 extend around the rear part of the axis 10. Although more complicated to achieve by molding, this second embodiment enables absorption by the lower transverse structure of the longitudinal forces to which the axis 10 is subjected when the flap 1 is in the open position and must oppose the deformations of the axis or flap generated by aerodynamic forces when the vehicle is travelling at high speed. This arrangement also enables a reduction in the rigidity of the axis of the aerodynamic underbody flap 1 so that, when the aerodynamic underbody flap 1 is in the open position, said axis 10 can deform slightly in order to come into contact with the front internal part of the lower and upper clamps.

As can be seen, the forms of cooperation between the axis 10 of the aerodynamic underbody flap 1 and the lower transverse structure 4, the mechanical resistance of which is added in the case of deformation of one or other of these elements, optimize the resistance of the vehicle under the action of a frontal impact, or under the action of aerodynamic pressure when the vehicle is travelling at high speed.

This is made possible by the presence of guide means that guide the backward movement of the lower transverse structure 4.

Also, the different embodiments of the invention described above can be subject to numerous variations without departing from the scope of the invention.

NOMENCLATURE

1 Aerodynamic underbody flap
10 Axis of the aerodynamic underbody flap
11 Bearing of the axis of the aerodynamic underbody flap
12 Window
13 Insert to reinforce the axis of the underbody aerodynamic flap
2 Longitudinal side member.
3 Upper transverse structure
30 Crash box
31 Fixing bolts
4 Lower transverse structure
41 Upper clamp
42 Lower clamp
5 Frame of the technical ront face
6 Bumper
P Cross-section
d Distance between the front end part of the frame of the technical front face and the front of the longitudinal side member

The invention claimed is:

1. The motor vehicle comprising an aerodynamic underbody flap (1) rotating about a transverse axis (10) and a lower transverse structure (4) arranged at the rear of a lower part of a front bumper (6) characterized in that a rear part of the lower transverse structure (4) comprises guide means (41, 42) which, in a event of a frontal impact, guide backward movement of the lower transverse structure (4) such that a rear face of the lower transverse structure (4) comes into contact with the axis (10) of the aerodynamic underbody flap (1).

2. The motor vehicle according to claim 1, wherein the axis of rotation (10) of the aerodynamic underbody flap (1) is mounted on bearings fixed onto a lower part of a frame (5) of a technical front face.

3. The motor vehicle according to claim 2, wherein the frame (5) of the technical front face is fixed onto a rear part of an upper transverse structure (3).

4. The motor vehicle according to claim 3, wherein the upper transverse structure (3) is fixed onto a front end of longitudinal side members (2) by means of crash boxes (30).

5. The motor vehicle according to claim 3, wherein the frame (5) of the technical front face is arranged at a distance of more than 100 mm from the front end of said longitudinal side members (2).

6. The motor vehicle according to claim 2, wherein the frame (5) of the technical front face is fixed directly onto longitudinal side members (2).

7. The motor vehicle according to claim 2, wherein the guide means (41, 42) are formed by one or more upper clamps (41) and by one or more lower clamps (42) extending the lower structure respectively above and below the axis (10) of the aerodynamic underbody flap (1).

8. The motor vehicle according to claim 7, wherein the aerodynamic underbody flap (1) has windows (12) arranged near the axis (10) to allow the passage of the lower clamps through the flap (1) when said aerodynamic underbody structure (1) is in the open position.

9. The motor vehicle according to claim 7, wherein the lower clamps (42) and the upper clamps (41) are arranged transversely and alternately.

10. The motor vehicle according to claim 7, wherein the lower clamps (42) and the upper clamps (41) extend around the rear part of the axis (10) of the aerodynamic underbody flap (1).

11. The motor vehicle according to claim 7, wherein the aerodynamic underbody flap (1) is made using a thermoplastic material.

12. The motor vehicle according to claim 11, wherein the axis (10) of the aerodynamic underbody flap comprises an inserted reinforcement piece (13) in the form of a rod made of metal or a composite material around which is molded a thermoplastic part forming the aerodynamic underbody flap (1).

* * * * *

UNITED STATES PATENT AND TRADEMARK OFFICE
CERTIFICATE OF CORRECTION

| | | |
|---|---|---|
| PATENT NO. | : 12,054,114 B2 | Page 1 of 1 |
| APPLICATION NO. | : 16/614266 | |
| DATED | : August 6, 2024 | |
| INVENTOR(S) | : Gérald Andre and Stéphane Ginja | |

It is certified that error appears in the above-identified patent and that said Letters Patent is hereby corrected as shown below:

On the Title Page

(71) Applicant: "Compagnie Plastic Omnium, Lyons (FR)" should read --Compagnie Plastic Omnium Lyon (FR)--

Signed and Sealed this
Eighteenth Day of March, 2025

Coke Morgan Stewart
*Acting Director of the United States Patent and Trademark Office*